United States Patent
Korsten

(10) Patent No.: US 6,526,914 B2
(45) Date of Patent: Mar. 4, 2003

(54) POULTRY HOUSE EQUIPMENT

(76) Inventor: Nicolaas Andreas Maria Korsten, Houtsberg 25, 6091 Na Leveroy (NL)

(*) Notice: Subject to any disclaimer, the term of this patent is extended or adjusted under 35 U.S.C. 154(b) by 0 days.

(21) Appl. No.: 09/972,936

(22) Filed: Oct. 10, 2001

(65) Prior Publication Data

US 2002/0121245 A1 Sep. 5, 2002

(30) Foreign Application Priority Data

Feb. 2, 2001 (NL) ............................................. 1017274

(51) Int. Cl.$^7$ ................................................ A01K 5/00
(52) U.S. Cl. .......................... 119/57.92; 56/57; 56/81
(58) Field of Search .......................... 119/57.92, 51.13, 119/70, 56.2, 57, 81, 51.11

(56) References Cited

U.S. PATENT DOCUMENTS

| | | | | |
|---|---|---|---|---|
| 3,587,529 A | * | 6/1971 | Wienert et al. ............ | 119/51.5 |
| 4,082,064 A | * | 4/1978 | Newell, III ............... | 119/51.11 |
| 4,557,368 A | * | 12/1985 | Alameda ..................... | 198/313 |
| 4,672,917 A | * | 6/1987 | Fox ............................ | 119/56.1 |
| 5,069,165 A | * | 12/1991 | Rousseau .................. | 119/51.02 |
| 5,309,864 A | * | 5/1994 | Harmsen et al. ......... | 119/51.02 |
| 5,353,740 A | * | 10/1994 | Pellerin ..................... | 119/57.92 |
| 5,505,160 A | * | 4/1996 | Pellerin ..................... | 119/57.1 |
| 5,526,769 A | * | 6/1996 | Pellerin ..................... | 119/57.92 |
| 5,964,185 A | * | 10/1999 | DeBonne et al. ........... | 119/56.2 |
| 5,983,833 A | * | 11/1999 | van der Lely .............. | 119/436 |

* cited by examiner

*Primary Examiner*—Yvonne Abbott
(74) *Attorney, Agent, or Firm*—Oblon, Spivak, McClelland, Maier & Neustadt, P.C.

(57) ABSTRACT

Poultry house equipment include water and/or feed bowls movable in a horizontal direction. The water and/or feed bowls are connected to at least one water and/or feed supply conduit configured to supply water and/or feed to the water and/or feed bowls. The water and/or feed supply conduit and the water and/or feed bowls connected to the water and/or feed supply conduit are movable in a direction substantially transverse to a longitudinal direction of the water and/or feed supply conduit via a moving member. Since the drinkers and/or feeders are movable in a horizontal direction within the poultry house, the animals will no longer concentrate around a fixed location in the poultry house, but they will scatter all over the poultry house in order for their excrements to be evenly distributed over the entire poultry house.

12 Claims, 2 Drawing Sheets

POULTRY HOUSE EQUIPMENT

The invention relates to poultry house equipment, comprising drinkers and/or feeders.

Poultry house equipment usually comprises both drinkers and feeders for the purpose of making both water and feed available to the poultry.

With poultry house equipment that is known per se, the drinkers and feeders are located at a fixed position within the poultry house. In this known poultry house it is possible, however, to move the drinkers and/or feeders in vertical direction in order to position said drinkers and/or feeders at a desired vertical level with respect to the floor, and furthermore in order to raise said drinkers and/or feeders to a level relatively high above the floor. This latter situation is desirable when the poultry house is to be cleared and cleaned.

During normal use of the poultry house equipment, that is, when the poultry is present in the poultry house, said drinkers and/or feeders are present at a fixed position within the poultry house. The poultry that is present in the poultry house will gather around the drinkers and/or feeders and deposit excrements at those locations. In addition, water will be spilled near the drinkers, as a result of which the area surrounding the drinker will become relatively moist.

Due both to the relatively large amounts of excrements deposited at a particular location and to the relatively moist areas, the living conditions in the poultry house are not optimal.

The object of the invention is to provide poultry house equipment wherein this problem of the known poultry house equipment is avoided.

This objective is accomplished with the poultry house equipment according to the invention in that the drinkers and/or feeders are movable in horizontal direction.

Since the drinkers and/or feeders are movable in horizontal direction within the poultry house, the animals will no longer concentrate around a fixed location in the poultry house, but they will scatter all over the poultry house. This means that also their excrements will be evenly distributed over the entire poultry house. The spilling of water will no longer take place at one concentrated location, but it will likewise occur along the entire path along which the drinkers are moved. As a result, the occurrence of relatively moist places in the poultry house will be prevented.

In this manner the poultry house floor will be fouled evenly, as a result of which the living conditions in the poultry house will be improved.

If the animals wish to eat and/or drink at a particular point in time, they will have to move to the drinkers and/or feeders. An alternative for the poultry is to wait until the drinkers and/or feeders are automatically moved in their direction.

Since the drinkers and/or feeders move relatively slowly, those animals that are present in the path of the drinkers and/or feeders will be prodded slightly, which will make them move out of the way.

One embodiment of the poultry house equipment according to the invention is characterized in that the poultry house equipment comprises at least one water and/or feed supply conduit and drinkers and/or feeders connected to said conduit, and means for moving said conduit and the bowls connected thereto in a direction transversely to the longitudinal direction of said conduit.

In this way it is possible, by moving a single conduit, to move a number of drinkers and/or feeders that are connected thereto simultaneously with said conduit.

The invention will now be explained in more detail with reference to the drawings, wherein.

Like parts are indicated by the same numerals in the figures.

Figure 1:
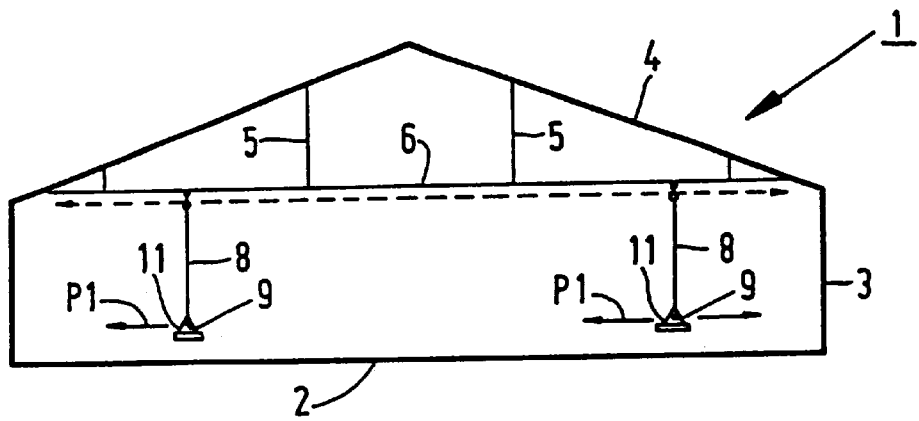
FIG. 1 is a cross-sectional view of a poultry house comprising equipment according to the invention.
Figure 2:
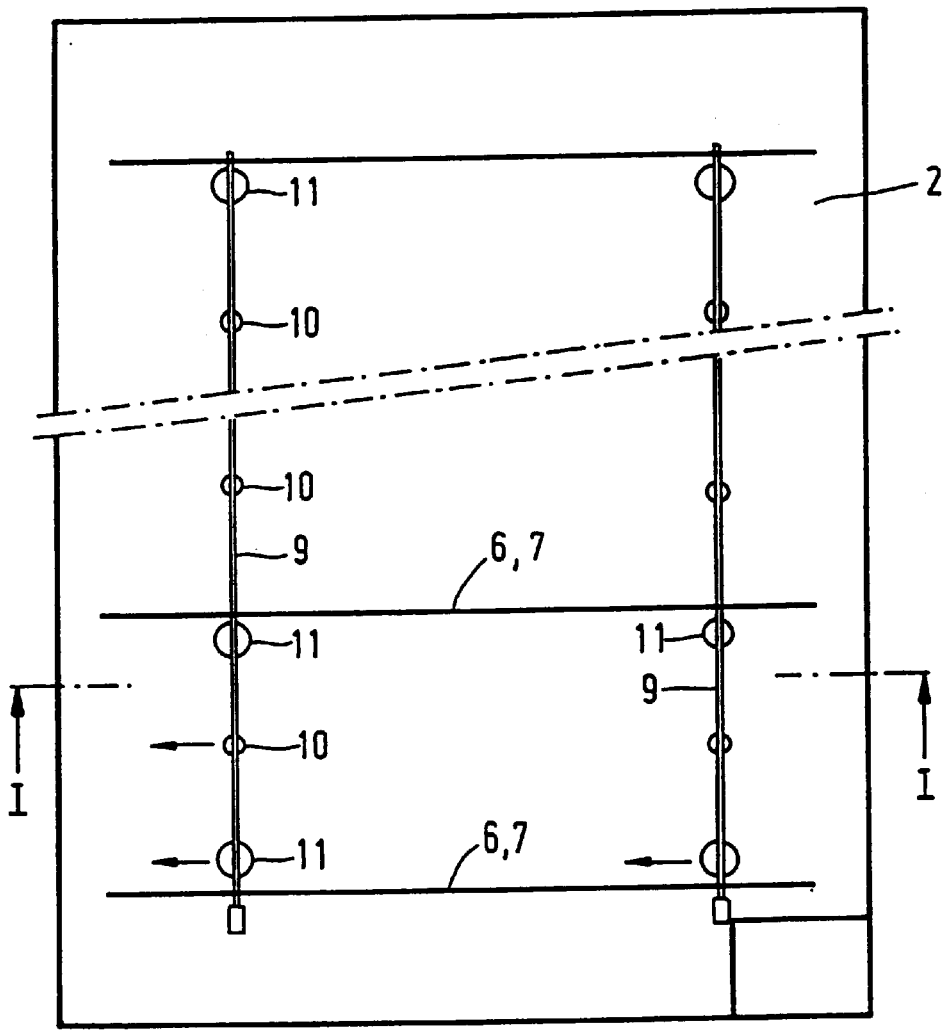
FIG. 2 is a top plan view of the poultry house of FIG. 1.

FIGS. 1 and 2 are a cross-sectional view and a top plan view, respectively, of a poultry house 1 according to the invention, which comprises a floor 2, walls 3 and a roof 4. Racks 6 are suspended from roof 4 by means of cables 5. Racks 6 extend parallel to each other in evenly spaced-apart relationship. Each rack 6 is provided with a guide rail 7 extending parallel to rack 6 (see FIG. 3). Conduits 9 extending transversely to rack 6 are suspended from guide rails 7 by means of windable cables 8. Conduits 9 each comprise a water supply line and a feed supply line. Drinkers 10 are connected to the water supply lines, whilst feeders 11 are connected to the feed supply lines. Conduits 9 can be moved horizontally, by means of pinions that mesh with racks 6 (see FIG. 3), in the direction indicated by arrow P1 and in the opposite direction.

Figure 3:
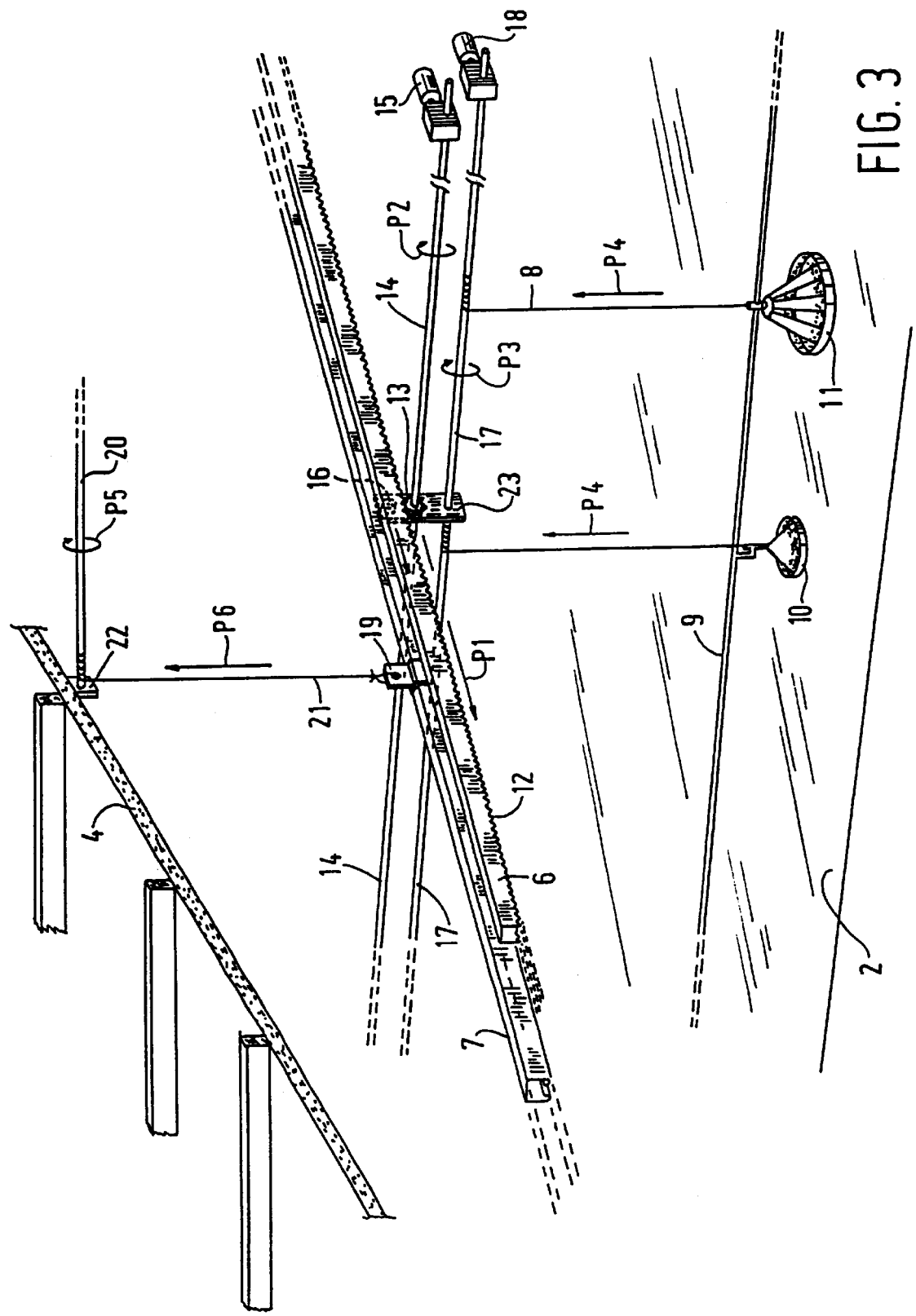
FIG. 3 is a perspective view of the equipment according to the invention of the poultry house that is shown in FIGS. 1 and 2.

FIG. 3 is a perspective view of the poultry house that is shown in FIGS. 1 and 2, wherein the various components are shown in more detail.

Rack 6 is made up of a U-shaped section, wherein the ends of the legs of the U-shape are provided with teeth 12 in a desired manner. Teeth 12 mesh with a pinion 13. Pinion 13 is journalled on a shaft 14, which can be rotated in the direction indicated by arrow P2 and in the opposite direction by means of a motor 15. Also journalled on shaft 14 are pinions 13, which mesh with a rack extending parallel to rack 6. Shaft 14 extends through a plate 23 extending transversely to shaft 14, which plate 23 is provided with a roller bearing 16, which is rotatably supported in U-shaped guide rail 7. Furthermore, a second shaft 17 extending parallel to first shaft 14 is rotatably supported in plate 23. Shaft 17, which can be rotated by means of a motor 18 in the direction indicated by arrow P3 and in the opposite direction, is provided with a number of windable cables 8 which can be wound onto shaft 17, which windable cables 8 are connected to a conduit 9 at an end remote from shaft 17. When shaft 17 is rotated in the direction indicated by arrow P3, windable cables 8 will be wound onto shaft 17, as a result of which conduit 9 will be moved upwardly in the direction indicated by arrow P4. When shaft 17 is rotated in the opposite direction, conduit 9 will be moved downwardly in the direction opposed to the direction indicated by arrow P4.

Rack 6 is connected, by means of a suspension bracket 19, to a cable 21 that can be wound onto a shaft 20. Shaft 20 is supported in a plate 22 connected to roof 4, being rotatable therein in the direction indicated by arrow P5 and in the opposite direction. Cable 21, and thus the rack 6 connected thereto, are moved upwards in the direction indicated by arrow P6 by rotating shaft 20 in the direction indicated by arrow P5.

Floor 2 can be cleared, for example for carrying out cleaning work, by moving racks 6 and conduits 9 in upward direction.

In use, the drinkers 10 and feeders 11 that are connected to conduit 9 are positioned at the desired vertical level with respect to floor 2 by moving rack 6 and conduits 9 in downward direction. In addition, racks 6 will be positioned at such a level in the poultry house that a desired clear height for walking remains ensured.

After racks 6 and conduit 9 have been positioned at the desired level, and the poultry, for example turkeys or chickens, have been brought into the poultry house, conduits 9 and thus the drinkers 10 and the feeders 11 connected thereto are moved in the direction indicated by arrow P1 and in the opposite direction by driving shaft 14. house 2, and if the poultry are thirsty or hungry, they will actively move towards the drinker or the feeder in question. It is also possible, however, for the poultry to scatter all over the poultry house and wait patiently until the water or the feed comes near. In this way also slightly weakened animals are enabled in a simple manner to ingest water or feed. In both cases the excrements will be distributed evenly over the entire poultry house. Also the spilling of water will take place over a much larger area, so that the occurrence of relatively wet spots will be avoided. Since there are fewer fouled spots and/or wet spots in the poultry house, cleaning will not be necessary, which leads to a considerable saving in labour.

It is possible to suspend various conduits in spaced-apart relationship from one and the same rack 6. Said conduits can thereby be jointly moved forward and backward or in opposed directions.

The velocity at which the conduits are moved through the poultry house is relatively low, so that the poultry can move out of the way when a conduit 9 approaches.

It is also possible to move the feeders by means of a steel cable drive, a chain drive or a V-rope drive rather than by means of a rack-and-pinion drive.

What is claimed is:

1. Poultry house equipment comprising:
   water and/or feed bowls movable in a horizontal direction;
   at least one water and/or feed supply conduit configured to supply water and/or feed to the water and/or feed bowls, wherein the water and/or feed bowls are connected to the water and/or feed supply conduit in order for the water and/or feed to be supplied to the water and/or feed bowls via the water and/or feed supply conduit; and
   means for moving the water and/or feed supply conduit and the water and/or feed bowls connected to the water and/or feed supply conduit in a direction substantially transverse to a longitudinal direction of the water and/or feed supply conduit.

2. The poultry house equipment according to claim 1, wherein both the water and/or feed supply conduit and the water and/or feed bowls connected to the water and/or feed supply conduit are movable in a vertical direction.

3. The poultry house equipment according to claim 1, further comprising:
   at least one horizontally extending rack;
   a rod extending in a direction transverse to the horizontally extending rack, the rod being fitted with a pinion meshing with the horizontally extending rack such that the water and/or feed supply conduit extends parallel to the rod and is connected to the rod.

4. The poultry house equipment according to claim 3, wherein the water and/or feed supply conduit is suspended from the rod via windable cables that can be wound up.

5. The poultry house equipment according to claim 3, wherein the rod is at least two rods, one of the two rods having been fitted with a pinion so as to be coupled to the horizontally extending rack, and both of the two rods being movable with respect to the horizontally extending rack.

6. The poultry house equipment according to claim 4, wherein the rod is at least two rods, one of the two rods having been fitted with a pinion so as to be coupled to the horizontally extending rack, and both of the two rods being movable with respect to the horizontally extending rack.

7. The poultry house equipment according to claim 5, wherein the two rods can be moved simultaneously.

8. The poultry house equipment according to claim 6, wherein the two rods can be moved simultaneously.

9. The poultry house equipment according to claim 5, wherein the two rods can be moved towards and away from each other.

10. The poultry house equipment according to claim 6, wherein the two rods can be moved towards and away from each other.

11. The poultry house equipment according to claim 3, wherein the horizontally extending rack is movable in a vertical direction.

12. A method suitable for operating poultry house equipment, wherein the poultry house equipment includes water and/or feed bowls movable in a horizontal direction, at least one water and/or feed supply conduit configured to supply water and/or feed to the water and/or feed bowls, wherein the water and/or feed bowls are connected to the water and/or feed supply conduit in order for the water and/or feed to be supplied to the water and/or feed bowls via the water and/or feed supply conduit, and means for moving both the water and/or feed supply conduit and the water and/or feed bowls connected to the water and/or feed supply conduit in a direction substantially transverse to a longitudinal direction of the water and/or feed supply conduit, the method comprising the step of:
   moving the water and/or feed supply conduit and the water and/or feed bowls back and forth substantially continuously in a direction substantially transverse to the longitudinal direction of the water and/or feed supply conduit.

* * * * *